May 28, 1929.  H. W. NORTON  1,715,171
CLAMP FOR EXTENSION RIMS
Filed Sept. 29, 1927
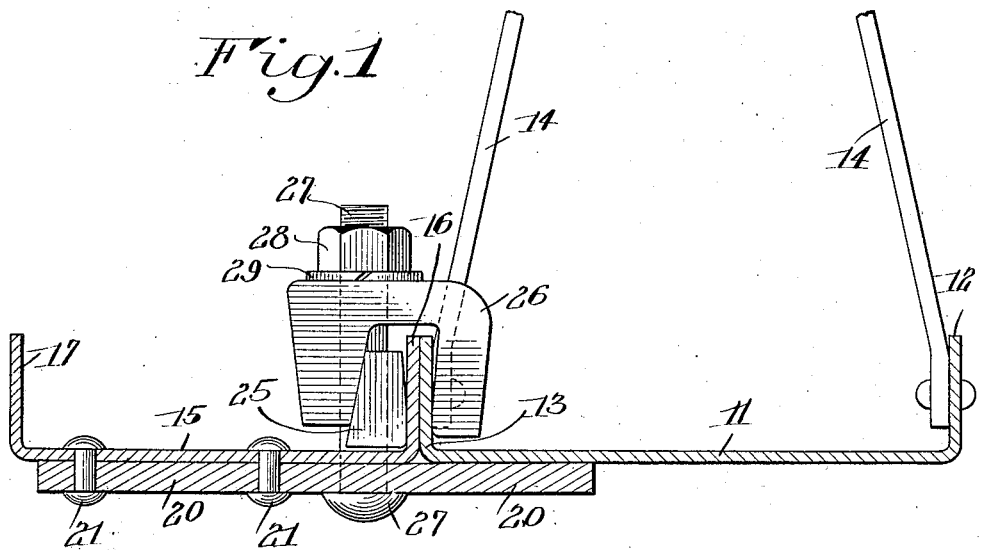
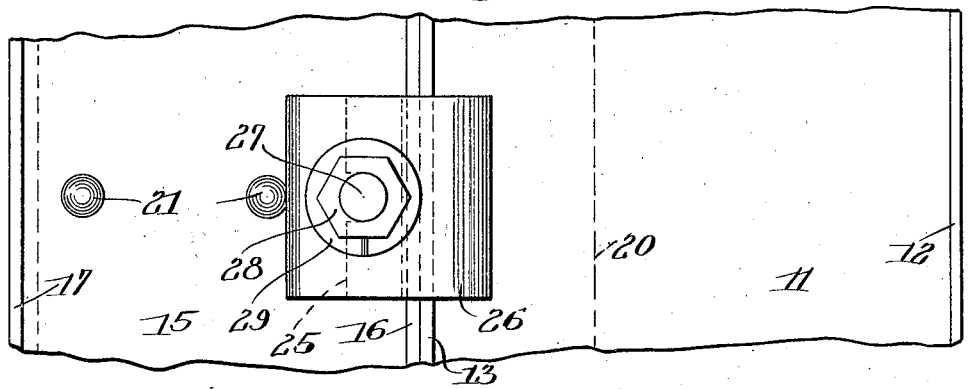
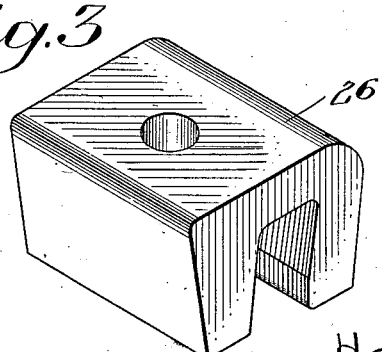
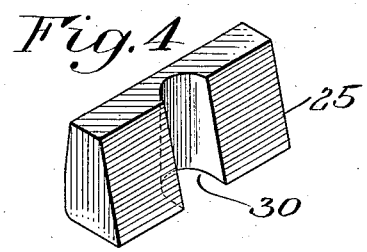
INVENTOR
Hyatt W. Norton
BY Harold E. Stonebraker
his ATTORNEY Patented May 28, 1929.

1,715,171

UNITED STATES PATENT OFFICE.

HYATT W. NORTON, OF ROCHESTER, NEW YORK.

CLAMP FOR EXTENSION RIMS.

Application filed September 29, 1927. Serial No. 222,795.

This invention relates to mechanism for retaining extension rims in cooperative relationship on the wheel rims of vehicles, and has for its principal object to provide a more practical, stronger, and more efficient construction for accomplishing this purpose than any of the devices heretofore known.

Another object of the invention is to provide a clamping mechanism which will enable the extension rim to be attached to or detached from the wheel rim easily and in a minimum of time.

A further object is to provide a construction which will hold the extension rim in positive alinement with the wheel rim at all times.

With these and other ends in view, the invention comprises the structure and combination of parts which will appear more clearly from the following description when read in conjunction with the accompanying drawings, the novel features being pointed out in the claims following the description.

In the drawings:

Figure 1 is a cross section taken radially through a wheel rim and an extension rim applied thereto, illustrating the action of one possible embodiment of the clamping mechanism;

Figure 2 is an inner plan of the parts shown in Figure 1;

Figure 3 is a perspective view of one embodiment of a clamping member, and

Figure 4 is a perspective view of a tapered member used in connection with the clamping member shown in Figure 3.

In the use of farm machinery, such as tractors for example, it is often found necessary or desirable to add an extension rim to the regular wheel rim, so as to widen the tread of the wheel. Such extension rims are well known, and various methods have been proposed for attaching them to the wheels, but all of these have defects or undesirable features of one kind or another. It is to overcome these defects that the present form of clamping mechanism, herein described, has been designed.

The rim of the wheel of the tractor or other vehicle to which this invention may be applied, consists usually of a tread portion 11, having an inwardly extending flange, 12 and 13, at each side thereof. Spokes 14 are attached to the flanges in any suitable manner, and extend radially inward to the hub of the wheel.

Alongside the wheel rim 11, and in axial alinement therewith, there may be placed an extension rim of any suitable form, so as to widen the tread of the wheel. In the embodiment shown, this extension rim consists of a tread portion 15, and inwardly extending flanges 16 and 17, similar to the flanges 12 and 13 on the wheel rim.

For holding the extension rim firmly in alinement with the wheel rim, means may be employed such as the alining member 20, attached to the periphery of the extension rim in any suitable way such as by the rivets 21, and overlapping the wheel rim, as shown clearly in Figure 1. Preferably several of these alining members 20 are spaced at intervals around the circumference of the rim, but if desired, a single strip of material may extend all the way around the rim, to make one continuous alining member.

Although the alining members 20 will act to prevent transverse displacement of the extension rim 15 relative to the wheel rim 11, it is obvious that they will not appreciably oppose axial separation of the two rims. Clamping mechanism is therefore provided to hold the rims firmly in place to prevent such separation, and this clamping mechanism also assists to some extent in holding the rims in alinement with each other.

In the form of clamping mechanism illustrated in the drawings, a tapered member 25 may be placed in the angle formed by the tread 15 and the flange 16 of the extension rim. Cooperating with this tapered member is a clamping member 26 having a generally U-shaped cross section. This clamping member 26 embraces the tapered member and the two flanges 13 and 16, as clearly shown in Figure 1, one of the arms of the clamping member being in contact with one side of the tapered member, and the other arm being in contact with the other side of the flange 13.

If the clamping member 26 be moved toward the periphery of the wheel, or in a direction from the thin end toward the thick end of the tapered member 25, it is obvious that it will tend to force the tapered member firmly against the flange 16, and at the same time will press against the opposite side of the flange 13. This will result in pulling the two flanges 13 and 16 tightly together, clamping them to each other so that the two rims can not become separated in an axial direction. Furthermore, the friction between the two flanges 13 and 16 in contact with each other will tend to prevent transverse displacement of the rims, and will thus assist the members 20 in holding the extension rim properly alined with the wheel rim.

To move the clamping member 26 in the direction above mentioned, and to hold it in place, various means may be employed. In the form here shown, this means comprises the bolt 27 extending through the rim 15, and carrying a nut 28 adapted, when screwed down, to bear against the clamping member 26 and to force it in the desired direction. A lock-nut washer 29 may be used, if preferred, to keep the nut 28 from working loose during use.

It will be understood that the parts above described, numbered from 25 to 29 inclusive, comprise one clamping unit. Ordinarily, a plurality of these units are used, spaced at convenient intervals around the circumference of the wheel.

Attention is directed to the fact that the clamping mechanism herein disclosed requires no changes whatever to be made in the regular wheel rim 11. No holes need be bored in the wheel, and no parts are permanently attached thereto. All parts of the clamping mechanism may be attached, however, to the auxiliary or extension rim 15 when it is not in use. After the extension rim has been removed from the wheel, the clamping member 26 may be placed back on the bolt 27, and the nut 28 may be given a few turns so as to hold it there. The tapered member 25 is held from falling out of place because of the passage of the bolt through the groove 30 in the member. Thus there are no loose parts of the mechanism which are liable to become lost when not being used. This is an important feature, for it is well known that small loose objects are apt to be lost or mislaid, especially on a farm, and a clamping mechanism such as herein described has a great advantage over one in which the parts are loose from the rim when not in use.

In using the device, the extension rim 15 is brought alongside the wheel rim 11 and placed in axial alinement therewith, and is then moved axially toward the wheel rim until the flanges 13 and 16 are tight against each other. The clamping members 26 are then placed on the various bolts 27, spaced at intervals around the wheel, so as to embrace the tapered members 25 and the flanges 13 and 16, as shown in Figure 1. The nuts 28 may then be screwed down to tighten the clamping mechanism to any desired degree. When it is desired to remove the extension rim, the process is reversed. The nuts are unscrewed, the clamping members 26 removed, and the extension rim is then pulled axially away from the wheel rim. The clamping members and nuts may then be replaced on the bolts for safekeeping, as has been mentioned above.

While one embodiment of the invention has been disclosed, it is to be understood that the inventive idea may be carried out in a number of ways. This application is therefore not to be limited to the precise details shown, but is intended to cover all modifications thereof falling within the spirit of the invention or the scope of the appended claims.

I claim:

1. The combination with a wheel rim having an inwardly extending flange at one edge, of an extension rim at one side of said wheel rim and in axial alinement therewith, an inwardly extending flange on said extension rim in parallel juxta-relation to the flange on the wheel rim, a tapered member in engagement with the outer surface of one of said flanges, and a clamping member engaging both said tapered member and the outer surface of the other of said flanges.

2. The combination with a wheel rim having an inwardly extending flange at one edge, of an extension rim at one side of said wheel rim and in axial alinement therewith, an inwardly extending flange on said extension rim in parallel juxta-relation to the flange on the wheel rim, a tapered member in engagement with the outer surface of one of said flanges, and a generally U-shaped clamping member engaging the outer surface of the other of said flanges and said tapered member.

3. The combination with a wheel rim having an inwardly extending flange at one edge, of an extension rim at one side of said wheel rim and in axial alinement therewith, an inwardly extending flange on said extension rim in contact with the flange on the wheel rim, a tapered member in engagement with the outer surface of one of said flanges, a clamping member engaging both said tapered member and the outer surface of the other of said flanges, and means tending to move said clamping member in a direction from the thin end toward the thick end of said tapered member, so as to clamp said flanges together.

4. The combination with a wheel rim having an inwardly extending flange, of an extension rim at one side of said wheel rim and in axial alinement therewith, an inwardly extending flange on said extension rim in contact with the flange on the wheel rim, an alining member attached to the outer surface of one of said rims and overlapping the other rim, a tapered member in the angle between the inner surface of one of said rims and the flange on said rim, and a generally U-shaped clamping member embracing the tapered member and the flanges on both of said rims and tending to clamp said flanges together.

5. A clamping mechanism for retaining an extension rim in cooperative relationship with a wheel rim, comprising a tapered member having a groove therein, a generally U-shaped clamping member having an aperture therein, and nut and bolt means passing through said groove and said aperture for drawing said clamping member in a direction from the thin end toward the thick end of said tapered member.

6. A clamping mechanism for retaining a flange of an extension rim in rigid engagement with a flange on a wheel rim, comprising a tapered member adapted to bear against the outer surface of one of said flanges, a clamping member adapted to bear against said tapered member and against the outer surface of the other of said flanges, and means for moving the clamping member relatively to the tapered member and thereby actuating the clamping member and tapered member laterally with respect to said flanges to bring the latter tightly into contact.

7. The combination with a wheel rim having an inwardly extending flange, of an extension rim at one side of said wheel rim, an inwardly extending flange on the extension rim in parallel juxtarelation to the flange on the wheel rim, a tapered member having a groove therein and abutting the outer surface of one of said flanges, said tapered member being arranged with its wider portion toward the periphery of the wheel and its narrower portion toward the center of the wheel, a generally U-shaped member having an aperture therein and engaging said tapered member and the outer surface of the other of said flanges, and a bolt passing through the aperture in the U-shaped member and the groove in the tapered member and acting to draw the U-shaped member toward the wide end of the tapered member and thereby effect a lateral movement of the tapered member and U-shaped member relatively to the flanges to bring the latter tightly into contact with each other.

In witness whereof, I have hereunto signed my name.

HYATT W. NORTON.